US006843562B1

(12) United States Patent
Ng (10) Patent No.: US 6,843,562 B1
(45) Date of Patent: Jan. 18, 2005

(54) SPECTACLE FRAME WITH TELESCOPIC EXTENDABLE TEMPLES AND INTEGRATED MAGNETS

(75) Inventor: Michael Hoi Ying Ng, Kowloon (CN)

(73) Assignee: EyeConcept Limited, Kowloon (CN)

( * ) Notice: Subject to any disclaimer, the term of this patent is extended or adjusted under 35 U.S.C. 154(b) by 0 days.

(21) Appl. No.: 10/874,633

(22) Filed: Jun. 23, 2004

(51) Int. Cl.[7] .............................................. G02C 5/20
(52) U.S. Cl. ...................... 351/118; 351/113; 351/119; 351/156
(58) Field of Search .............................. 351/118, 119, 351/156, 113, 111, 157, 158, 41; 2/453

(56) References Cited

U.S. PATENT DOCUMENTS

| | | | | |
|---|---|---|---|---|
| 4,479,703 A | * | 10/1984 | Enghofer | 351/123 |
| 5,666,181 A | | 9/1997 | Conway | 351/113 |
| 5,790,228 A | * | 8/1998 | Bell, III | 351/118 |
| 5,889,575 A | | 3/1999 | Wang | 351/113 |
| 6,059,411 A | * | 5/2000 | Moody | 351/118 |
| 6,547,388 B1 | * | 4/2003 | Bohn | 351/118 |
| 6,568,805 B1 | | 5/2003 | Dietz | 351/112 |

FOREIGN PATENT DOCUMENTS

CA       2137939       6/1996

* cited by examiner

Primary Examiner—Hung Xuan Dang
(74) Attorney, Agent, or Firm—Alix,Yale & Ristas, LLP (57) ABSTRACT

A spectacle frame includes a frame body and first and second temples. Each of the temples includes fixed and extendable temple members, each of which extends longitudinally from a proximal end to a distal end and has a proximal and distal end portions. The proximal end of the fixed temple member is connected to the frame body. The extendable temple member is extendable from a normal position, where the proximal end portion of the extendable temple member is proximate to the proximal end portion of the fixed temple member and the distal end portion of the extendable temple member is proximate to the distal end portion of the fixed temple member, and an extend position, where the proximal end portion of the extendable temple member is proximate to the distal end portion of the fixed temple member and the distal end portion the extendable temple member is longitudinally spaced from the distal end portion of the fixed temple member. A biasing device provides a biasing force for urging the extendable temple member to the extended position. A latch releasably locks the extendable temple member in the normal position against the biasing force of the biasing device.

19 Claims, 7 Drawing Sheets

SPECTACLE FRAME WITH TELESCOPIC EXTENDABLE TEMPLES AND INTEGRATED MAGNETS

BACKGROUND OF THE INVENTION

This invention relates generally to eyeglasses. More particularly, the present invention relates to eyeglass frames.

Typical eyeglasses or spectacles consist of a frame including a frame body that houses two lenses on either side of a nose piece. Attached to the frame body are two temples that extend from the two ends of the frame body. The temples pivot between an open position perpendicular with the frame body and a closed position parallel with the frame body. The temples and nose piece support the frame on the head of the wearer. However, during physical activity or during severe weather, such support is often insufficient.

Individuals often remove their eyeglasses temporarily. They may put them down and not recall where, they may attach a cord to the ends of the temples so that the eyeglasses may hang around their neck where they bounce against their chest, or they may put them in a pocket and have them fall out and/or get damaged. Various solutions have been proposed to solve this problem.

Mechanical clasps have been proposed to clip eyeglasses to a garment worn by the user. These clasps are cumbersome and may weaken over time, losing their ability to hold eyeglasses securely. Moreover, clasps can break, thereby causing the eyeglasses to come loose, fall and break, or be lost. Some mechanical clasps also depend on the availability of a shirt pocket, a cap visor, belt, holder, straps, or the like. Eyeglasses using such mechanical clips may not be securely held in place when inverted, such as when a person bends over at the waist.

U.S. Pat. No. 6,568,805 proposes an eyeglasses clasp having a pair of magnets mounted on the eyeglass temples. The frame body and one of the closed temples are positioned on one side of a piece of clothing material and the second temple is then pivoted into the closed position such that it is on the other side of the clothing material. With the temple bars closed, the magnets are attracted to each other, imparting a gripping force on the article of clothing. The gripping force substantially prevents movement between the temples and the clothing material. However, the use of such a clasp still requires the use of a shirt pocket or the like.

SUMMARY OF THE INVENTION

Briefly stated, the invention in a preferred form is a spectacle frame which comprises a frame body for housing a pair of lenses and first and second temples. Each of the temples includes fixed and extendable temple members. The fixed temple member extends longitudinally from a proximal end to a distal end and has a proximal end portion, a distal end portion, an intermediate portion disposed between the proximal and distal end portions, and inner and outer surfaces. The proximal end of the fixed temple member is connected to the frame body. The extendable temple member extends longitudinally from a proximal end to a distal end and has a proximal end portion, a distal end portion, an intermediate portion disposed between the proximal and distal end portions, and inner and outer surfaces. The extendable temple member is extendable from a normal position, where the proximal end portion of the extendable temple member is proximate to the proximal end portion of the fixed temple member and the distal end portion of the extendable temple member is proximate to the distal end portion of the fixed temple member, and an extend position, where the proximal end portion of the extendable temple member is proximate to the distal end portion of the fixed temple member and the distal end portion the extendable temple member is longitudinally spaced from the distal end portion of the fixed temple member. A biasing device provides a biasing force for urging the extendable temple member to the extended position. A latch releasably locks the extendable temple member in the normal position against the biasing force of the biasing device.

Each temple also includes a magnet mounted to the distal end portion of the extendable temple member.

The inner surfaces and the outer surfaces of the fixed and extendable temple members define an arcuate shape conforming to the shape of the human head.

The proximal end of the fixed temple member may be pivotally connected to the frame body, whereby the temples are pivotable between an open position perpendicular with the frame body and a closed position parallel with the frame body, or immovably connected to the frame body.

In one embodiment, the extendable temple member defines a bore extending from the proximal end to the distal end portion, and the fixed temple member is received and slidably movable within the extendable temple member bore. The biasing device may comprise a spring disposed within the extendable temple member bore, a proximal end of the spring contacting the distal end of the fixed temple member and a distal end of the spring contacting an interior shelf formed by the extendable temple member bore. Each temple further includes an extension limiting device for preventing the biasing device from ejecting the fixed temple member from the extendable temple member bore.

In another embodiment, the fixed temple member defines a bore extending from the distal end of the fixed temple member to the proximal end portion of the fixed temple member, and the extendable temple member is received and slidably movable within the fixed temple member bore. The biasing device may comprise a spring disposed within the fixed temple member bore, a distal end of the spring contacting the proximal end of the extendable temple member and a proximal end of the spring contacting an interior shelf formed by the fixed temple member bore. Each temple further includes an extension limiting device for preventing the biasing device from ejecting the extendable temple member from the fixed temple member bore.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

With reference to the drawings wherein like numerals represent like parts throughout the several figures, a spectacle frame in accordance with the present invention is generally designated by the numeral 10.

The eyeglass or spectacle frame 10 includes a frame body 12 having two frame segments 14, for housing two lenses 16, on either side of a nose segment 18. Attached to the frame body 12, are two temples 20 that extend from the two ends 22 of the frame body 12. Preferably, the temples 20 pivot between an open position perpendicular with the frame body 12 and a closed position parallel with the frame body 12. The temples 20 and nose segment 18 support the frame 10 on the head 24 of the wearer.

Each temple 20 includes a fixed temple member 26 and an extendable temple member 28. Preferably, the proximal end 30 of the fixed temple member 26 is pivotally connected to the frame body 12 in a manner known in the art. Alternatively, the fixed temple member 26 may be immovably connected to the frame body 12. In this embodiment, the fixed temple member may be manufactured as a unitary part of the frame body, defining a fixed temple segment of the frame body.

The fixed temple member 26 and the extendable temple member 28 each extend longitudinally from a proximal end 30, 34 to a distal end 36, 38, having oppositely disposed upper and lower edges, oppositely disposed inner surfaces 40, 42 and outer surfaces 44, 46, a proximal end portion 48, 50, a distal end portion 52, 54 and an intermediate portion 56, 58 disposed between the proximal and distal end portions. A magnet 60 is mounted to the distal end portion 54 of each extendable temple member 28. Preferably, the inner surfaces 40, 42 and outer surfaces 44, 46 of the fixed and extendable temple members 26, 28 define an arcuate shape conforming to the shape of the human head 24.

Figure 1:
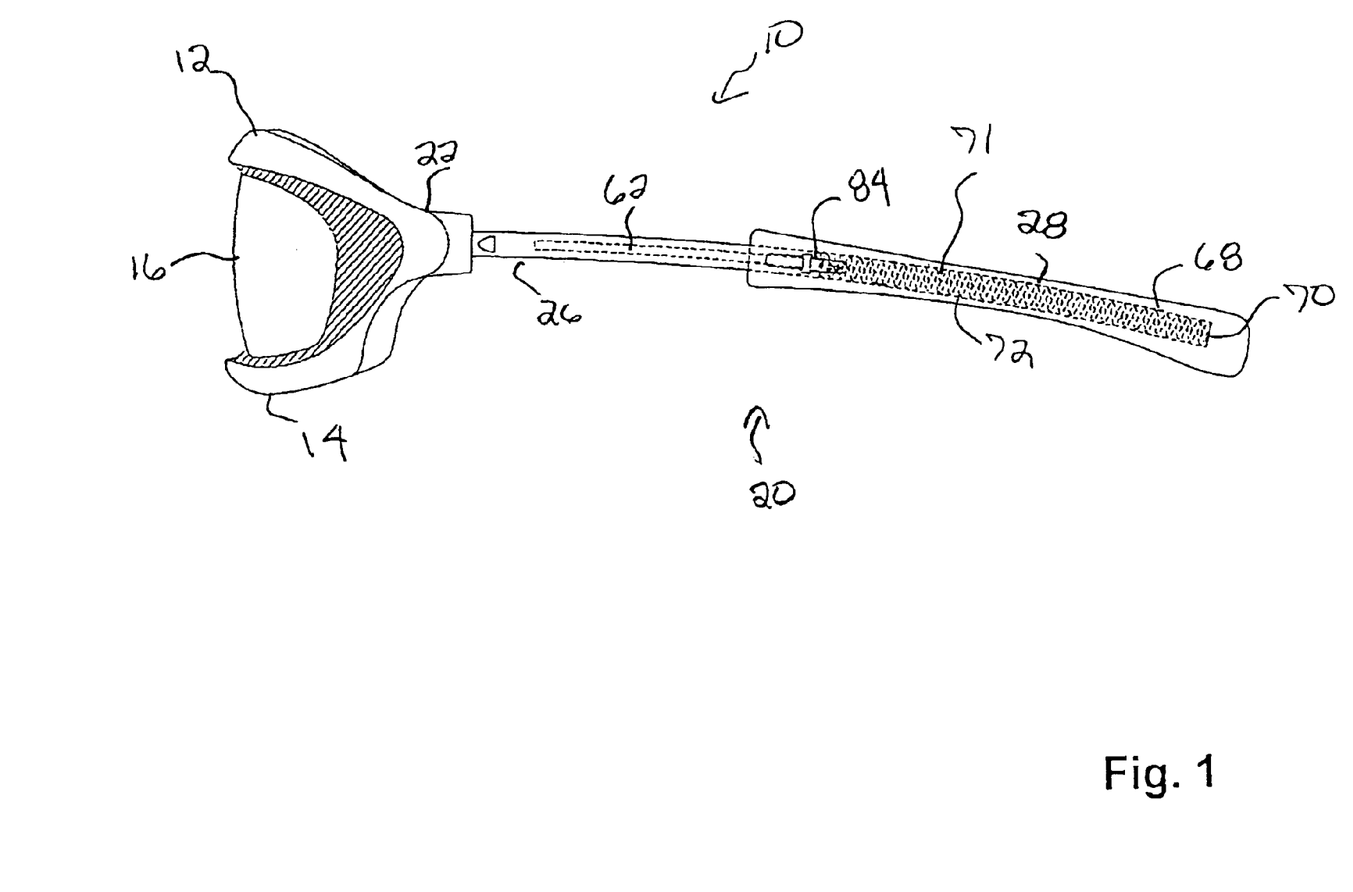
FIG. 1 is a side view, partly in phantom, of a first embodiment of spectacle frame in accordance with the invention, with the extendable temple member in the extended position.
Figure 2:
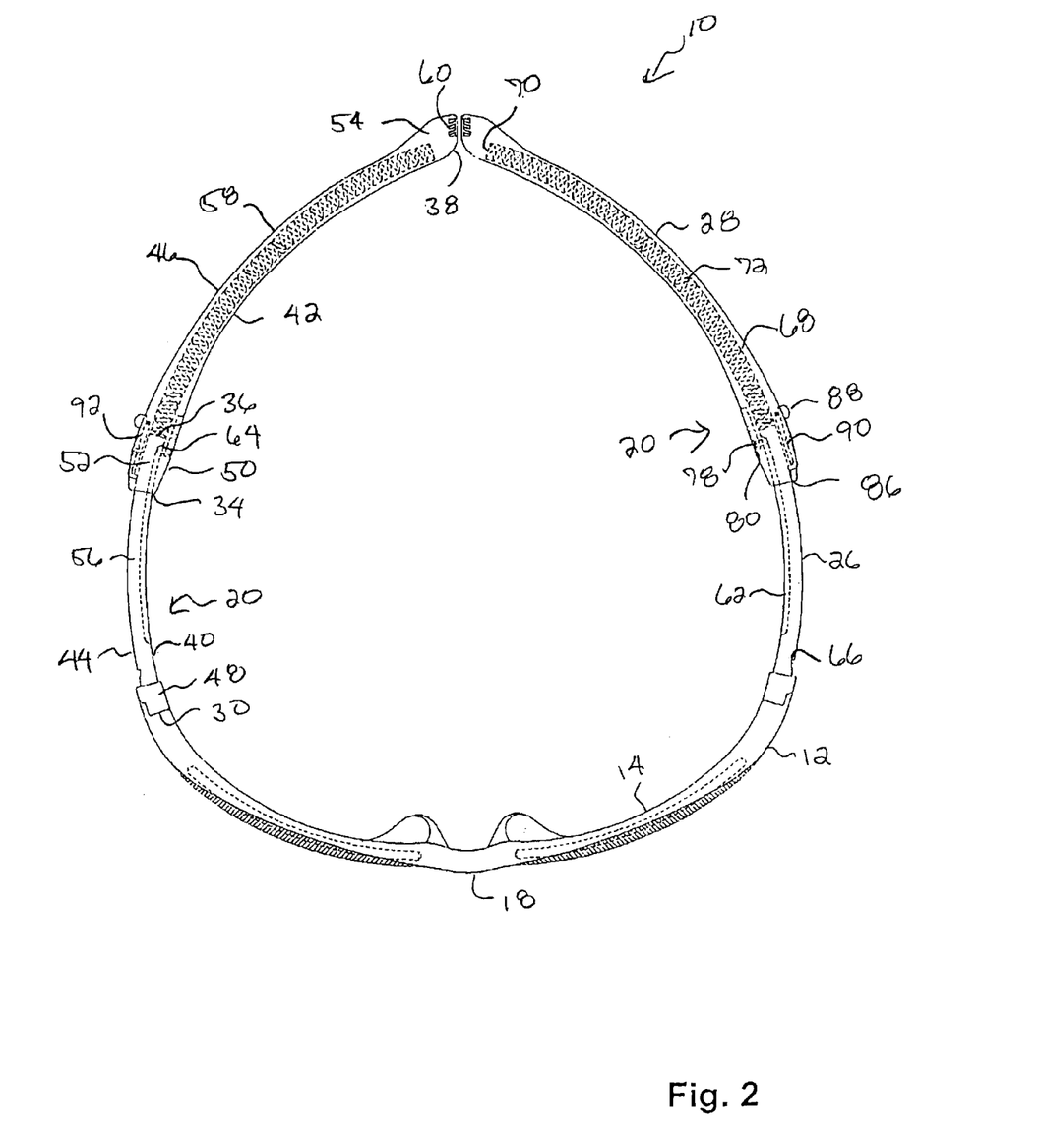
FIG. 2 is a top view, partly in phantom, of the spectacle frame of FIG. 1.
Figure 3A:
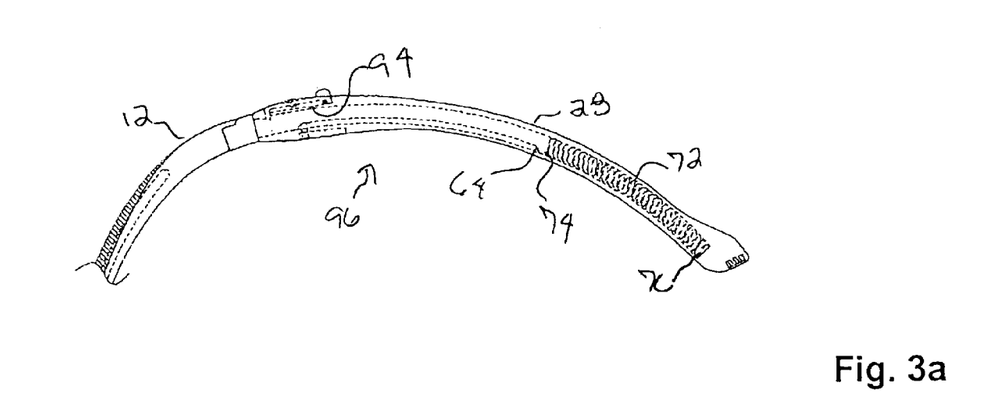
FIG. 3a is an enlarged top view, partly in phantom, of a portion of the spectacle frame of FIG. 1, illustrating the extendable temple member in the normal position.
Figure 3B:
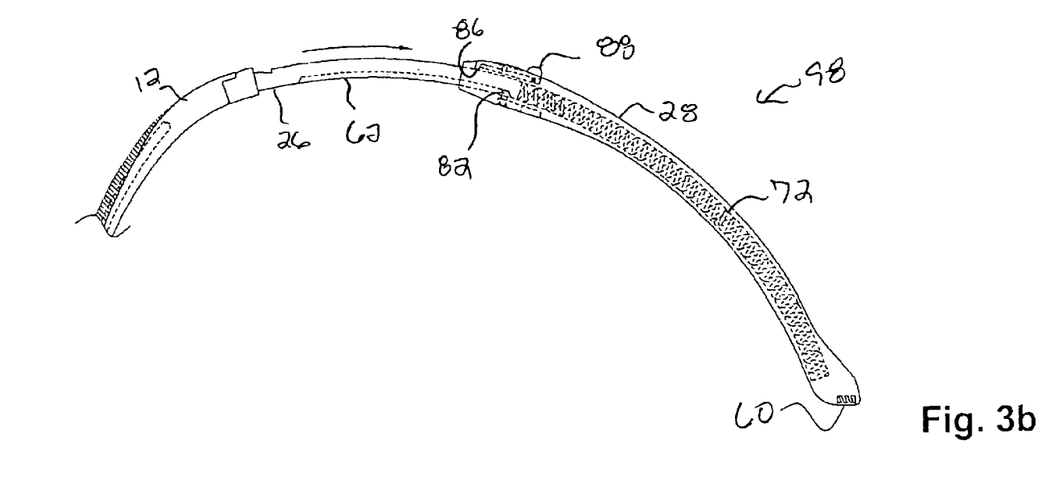
FIG. 3b is a top view, partly in phantom, of portion of the spectacle frame of FIG. 1, illustrating the extendable temple member in the extended position.

In the embodiment of FIGS. 1–3, the inner surface 40 of the intermediate portion 56 of each fixed temple member 26 has a longitudinally extending groove 62 forming a shoulder 64 at the juncture with the distal end portion 52 of the fixed temple member 26. The outer surface 44 of the intermediate portion 56 of each fixed temple member 26 has a laterally extending notch 66, preferably positioned proximate to the proximal end portion 48. A bore 68 extends from the proximal end 34 of the extendable temple member 28 to the distal end portion 54 of the extendable temple member 28, forming an interior shelf 70 in the distal end portion 54 of the extendable temple member 28. The bore 68 has an arcuate shape and a cross-sectional profile conforming to the arcuate shape and cross-sectional profile of the fixed temple member 26, such that the fixed temple member 26 is received and slidably movable within the bore 68.

A biasing device 71, such as a compression spring 72, is disposed within each bore 68, with the proximal end 74 of the spring 72 contacting the distal end 36 of the fixed temple member 26 and the distal end 76 of the spring 72 contacting the extendable temple member interior shelf 70. The distal end portion 52 of the fixed temple member 26 is inserted into bore 68 against the spring force of spring 72 and a pin 78 is inserted through an opening 80 in the inner surface 42 of the proximal end portion 50 of the extendable temple member 28 after the shoulder 64 of the fixed temple member 26 is inserted past the opening 80. The inner end portion of the pin 78 is received within groove 62 such that the pin 78 is engageable with shoulder 64 to prevent spring 72 from ejecting the fixed temple member 28 from bore 68. The proximal end portion 50 of each extendable temple member 28 includes a latch 84 having a catch 86 that extends laterally into bore 68 and an actuator 88 that extends laterally past outer surface 46. In one embodiment, a rocker segment 90, extending longitudinally between the catch 86 and the actuator 88, is pivotally mounted within a receptacle 92 in the outer surface 46 of the extendable temple member 28. A leaf spring or similar device biases the catch into bore 68 and the actuator 88 outwardly from outer surface 46.

The extendable temple member 28 is longitudinally movable along the fixed temple member 26 from a normal position 96, where the proximal end portion 50 of the extendable temple member 28 is proximate to the proximal end portion 48 of the fixed temple member 26 and the distal end portion 54 of the extendable temple member 28 is proximate to the distal end portion 52 of the fixed temple member 26, (FIGS. 3a, 5a and 5b) to an extended position 98, where the proximal end portion 50 of the extendable temple member 28 is proximate to the distal end portion 52 of the fixed temple member 26 and the distal end portion 54 the extendable temple member 28 is longitudinally spaced from the distal end portion 52 of the fixed temple member 26 (FIGS. 1, 2, 3b, 6a, 6b, 7a, 7b). The catch 86 of each extendable temple member latch 84 is engageable with the notch 66 in the proximal end portion 48 of the fixed temple member 26 to lock the extendable temple member 28 in the normal position 96 against the force of spring 72. Depressing the latch actuator 88 disengages the latch catch 86 from the fixed temple member notch 66, allowing the spring force of spring 72 to extend the extendable temple member 28 to the extended position 98. The extendable temple member 28 is returned to the normal position 96 by pushing fixed temple member 26 into the bore 68 of the extendable temple member 28, against the spring force of spring 72, until the latch catch 86 engages the fixed temple member notch 66. At least the distal end portion 52 and the intermediate portion 56 of the fixed temple member 26 are received within the bore 68 when the extendable temple member 28 is in the normal position 96.

Figure 4A:
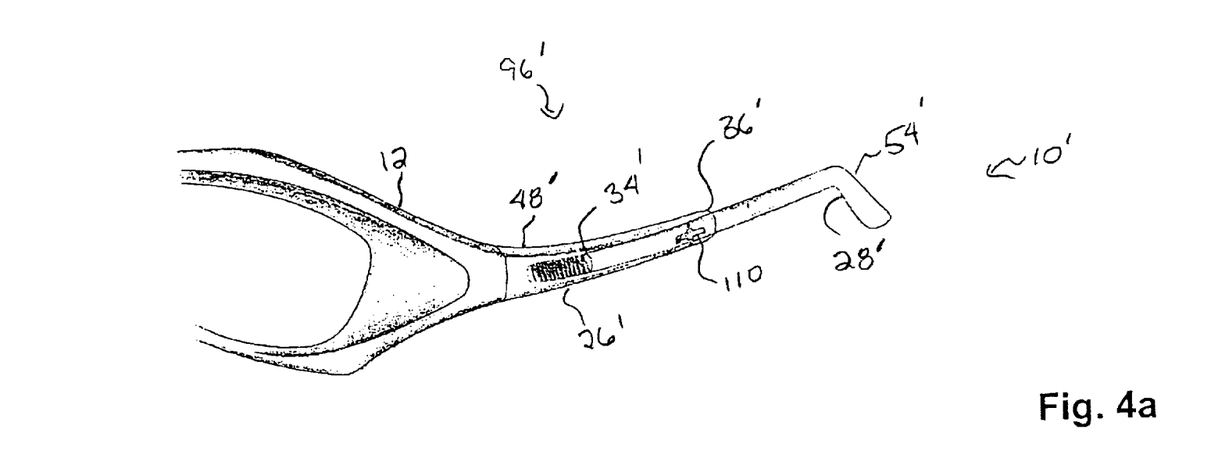
FIG. 4a is a perspective view, partly in phantom, of a portion of a second embodiment of a spectacle frame in accordance with the invention, illustrating the extendable temple member in the normal position.
Figure 4B:
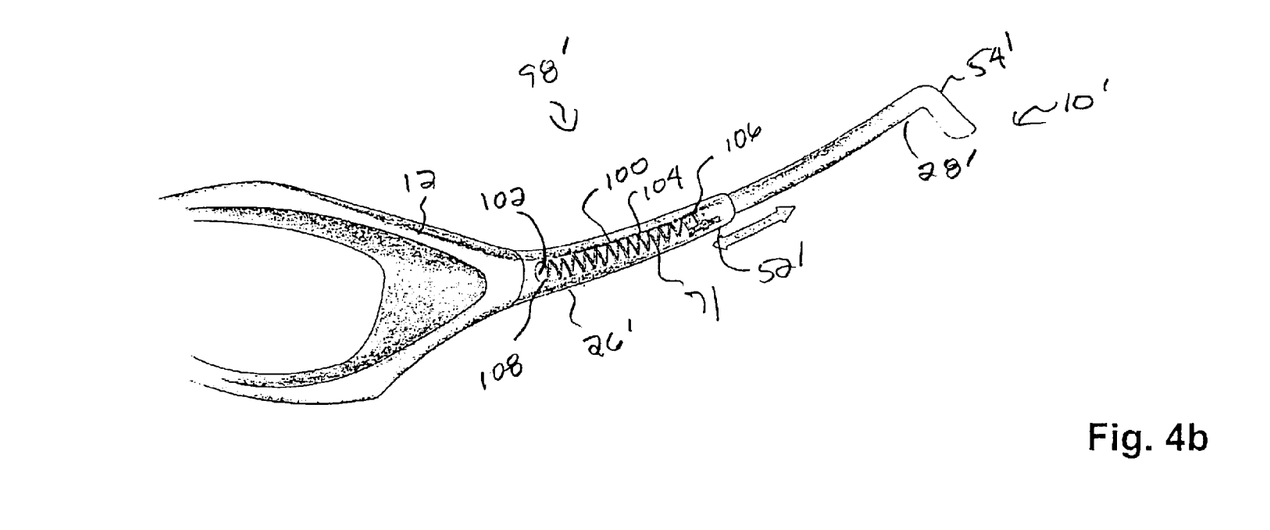
FIG. 4b is a perspective view, partly in phantom, of the portion of the spectacle frame of FIG. 4a, illustrating the extendable temple member in the extended position.

In the embodiment of FIGS. 4a and 4b, a bore 100 extends from the distal end 36' of the fixed temple member 26' to the proximal end portion 48' of the fixed temple member 26', forming an interior shelf 102 in the proximal end portion 48' of the fixed temple member 26'. The bore 100 has an arcuate shape and a cross-sectional profile conforming to the arcuate shape and cross-sectional profile of the extendable temple member 28', such that the extendable temple member 28' is received and slidably movable within the bore 100.

A compression spring 104 is disposed within each bore 100, with the distal end 106 of the spring 104 contacting the proximal end 34' of the extendable temple member 28' and the proximal end 108 of the spring 104 contacting the fixed temple member interior shelf 102. An extension limiting device, such as the pin and shoulder of the first embodiment, prevent the extendable temple member 28' from being ejected from bore 100. The distal end portion 52' of each fixed temple member 26' includes a latch 110 having a catch and an actuator.

The extendable temple member 28' is longitudinally movable within the fixed temple member bore 100 from a normal position 96' (FIG. 4a) to an extended position 98' (FIG. 4b). The catch of each fixed temple member latch 110 is engageable with a notch in the extendable temple member 28' to lock the extendable temple member 28' in the normal position 96' against the force of spring 104. Depressing the latch actuator disengages the latch catch from the notch, allowing the spring force of spring 104 to extend the extendable temple member 28' to the extended position 98'. The extendable temple member 28' is returned to the normal position 96' by pushing extendable temple member 28' into the bore 100 of the fixed temple member 26', against the spring force of spring 104, until the latch catch engages the notch.

Figure 5A:
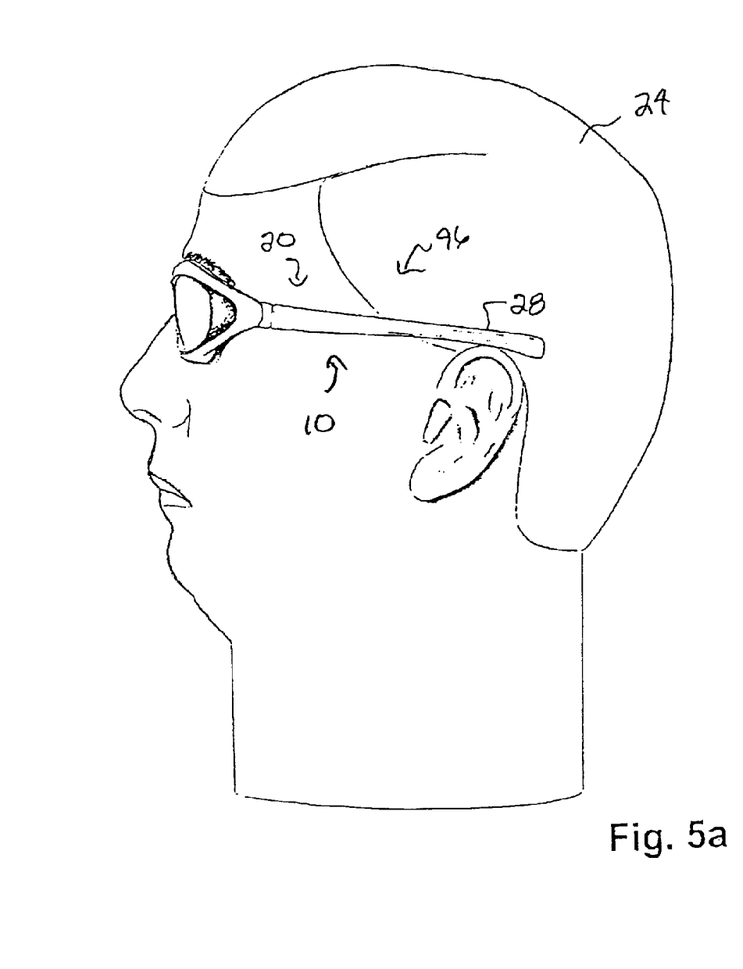
FIG. 5a is a side view of a person wearing the spectacle frame of FIG. 1, with the extendable temple member in the normal position.
Figure 5B:
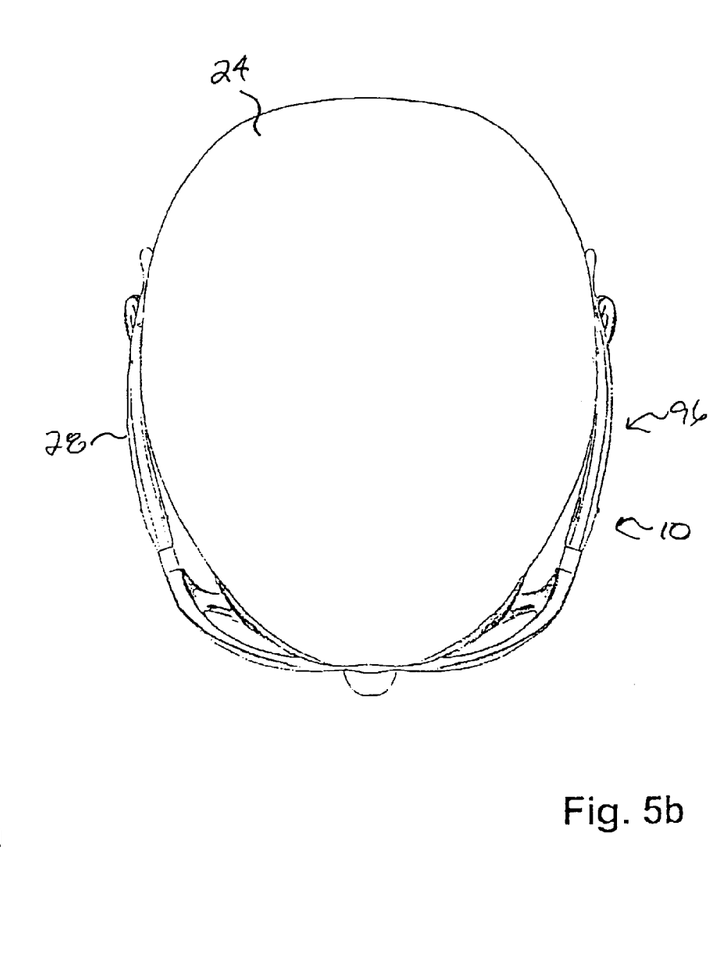
FIG. 5b is a top view of a person wearing the spectacle frame of FIG. 1, with the extendable temple member in the normal position.
Figure 6A:
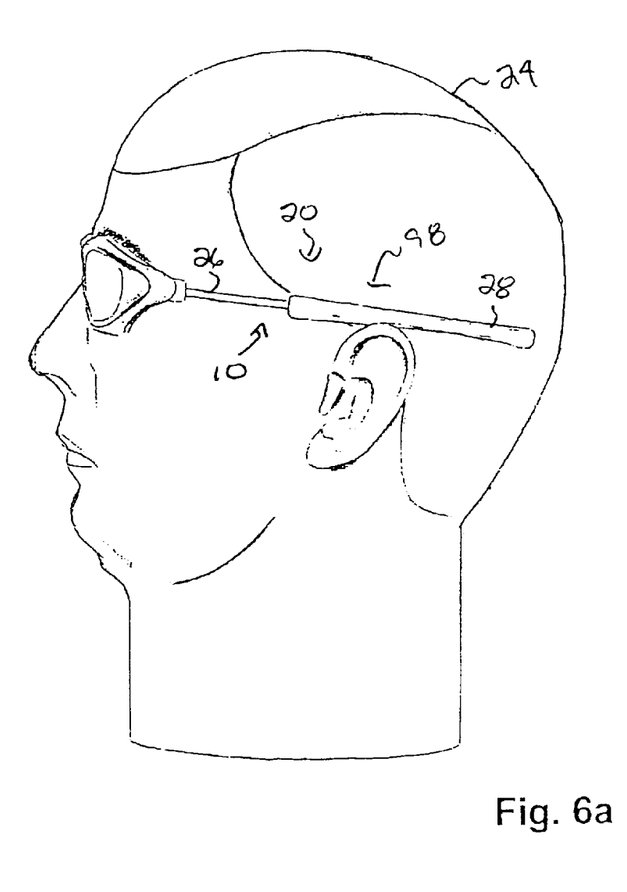
FIG. 6a is a side view of a person wearing the spectacle frame of FIG. 1, with the extendable temple member in the extended position.
Figure 6B:
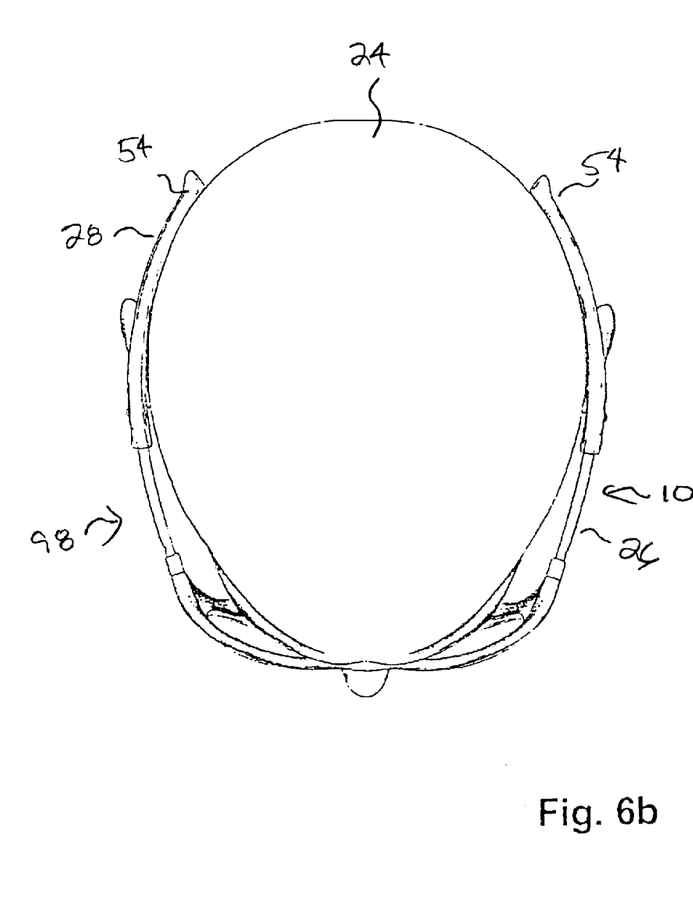
FIG. 6b is a top view of a person wearing the spectacle frame of FIG. 1, with the extendable temple member in the extended posibon.
Figure 7A:
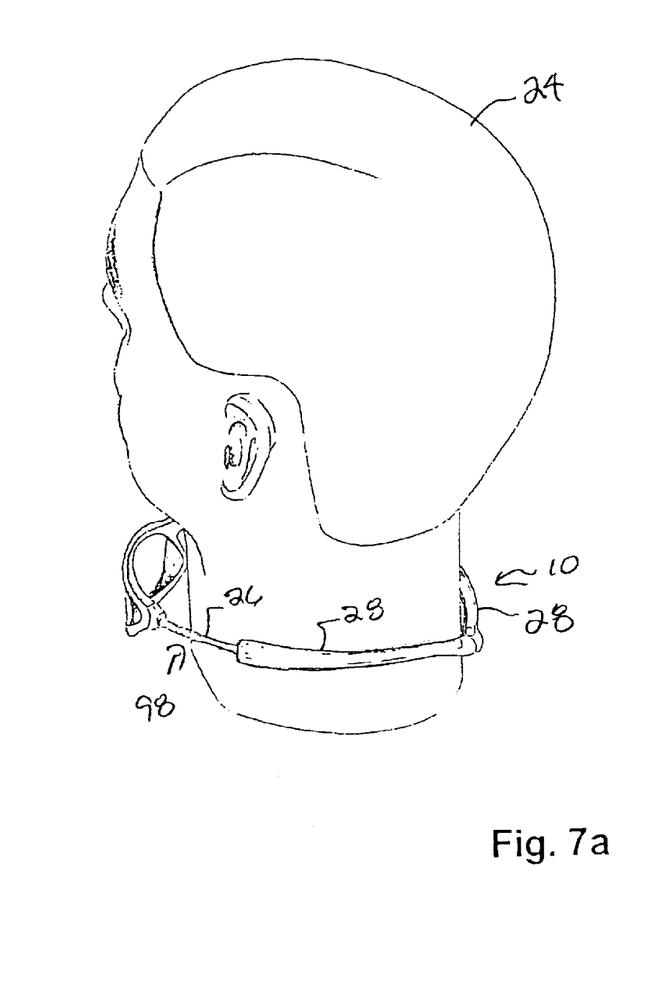
FIG. 7a is a perspective view of a person having the spectacle frame of FIG. 1 clasped around their neck.
Figure 7B:
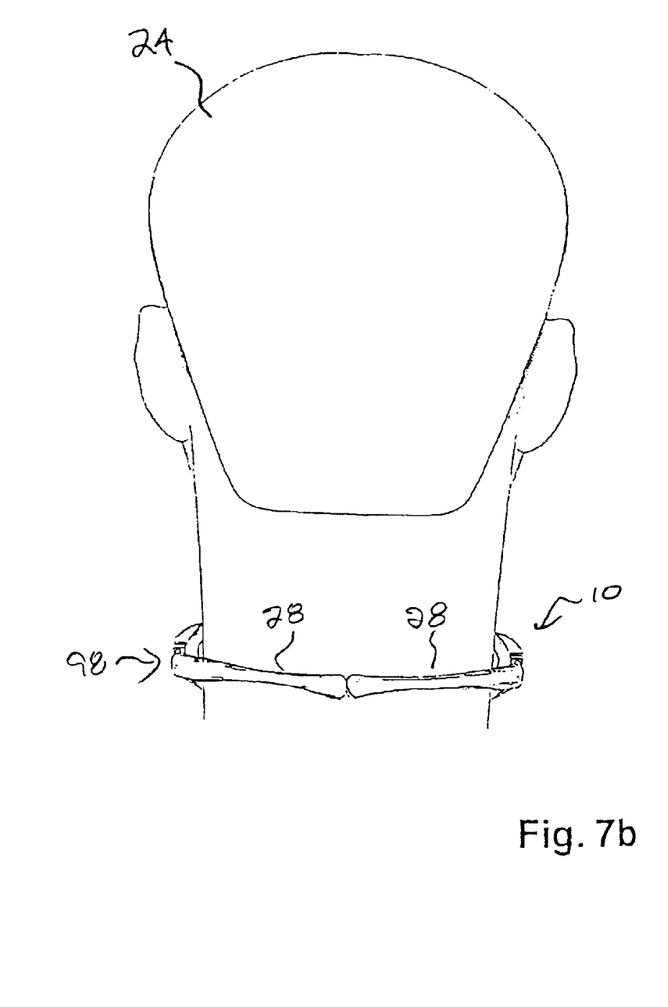
FIG. 7b is a rear view of a person having the spectacle frame of FIG. 1 clasped around their neck.

It should be appreciated that the subject spectacle frame 10, 10' provides substantially the same support as a conventional eyeglass frame when the extendable temple members 28, 28' are in the normal position 96, 96' (FIGS. 5a, 5b). However, the temple 20 extends further backward relative to the user's face when the extendable temple members 28, 28' are extended to the extended position 98, 98' (FIGS. 6a, 6b). Due to their arcuate shape, the extendable temple members 28, 28' wrap behind the user's head 24. Accordingly, the distal end portions 54, 54' of the extendable temple members 28, 28' will contact the back of the user's head 24 during periods of physical activity or during high winds, to prevent the glasses from falling off. It should also be appreciated that when the extendable temple members 28, 28' are in the extended position 98, 98', the spectacles may be hung around the user's neck, with the magnets 60 magnetically connecting the distal end portions 54, 54' of the extendable temple members 28, 28' (FIGS. 7a, 7b). It should be further appreciated that a biasing device 71 other than spring 72 or spring 104 may be used to provide the force necessary to move the extendable temple members 28, 28' to the extended position 98, 98'. For example, a miniature hydraulic cylinder or other mechanical means known in the art may be used.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A spectacle frame comprising:
   a frame body adapted for housing a pair of lenses; and
   first and second temples, each of the temples including
      a fixed temple member extending longitudinally from a proximal end to a distal end and having a proximal end portion, a distal end portion, an intermediate portion disposed between the proximal and distal end portions, and inner and outer surfaces, the proximal end of the fixed temple member being connected to the frame body;
      an extendable temple member extending longitudinally from a proximal end to a distal end and having a proximal end portion, a distal end portion, an intermediate portion disposed between the proximal and distal end portions, and inner and outer surfaces, the extendable temple member being extendable from a normal position, where the proximal end portion of the extendable temple member is proximate to the proximal end portion of the fixed temple member and the distal end portion of the extendable temple member is proximate to the distal end portion of the fixed temple member, and an extend position, where the proximal end portion of the extendable temple member is proximate to the distal end portion of the fixed temple member and the distal end portion the extendable temple member is longitudinally spaced from the distal end portion of the fixed temple member;
      a biasing device providing a biasing force for urging the extendable temple member to the extended position; and
      a latch for releasably locking the extendable temple member in the normal position against the biasing force of the biasing device.

2. The spectacle frame of claim 1 wherein each temple also includes a magnet mounted to the distal end portion of the extendable temple member.

3. The spectacle frame of claim 1 wherein the inner surfaces and the outer surfaces of the fixed and extendable temple members define an arcuate shape conforming to the shape of the human head.

4. The spectacle frame of claim 1 wherein the proximal end of the fixed temple member is pivotally connected to the frame body, whereby the temples are pivotable between an open position perpendicular with the frame body and a closed position parallel with the frame body.

5. The spectacle frame of claim 1 wherein the fixed temple member is immovably connected to the frame body.

6. The spectacle frame of claim 1 wherein the extendable temple member defines a bore extending from the proximal end to the distal end portion, the bore forming an interior shelf in the distal end portion of the extendable temple member.

7. The spectacle frame of claim 6 wherein the fixed temple member is received and slidably movable within the extendable temple member bore.

8. The spectacle frame of claim 7 wherein the biasing device comprises a spring disposed within the extendable temple member bore, a proximal end of the spring contacting the distal end of the fixed temple member and a distal end of the spring contacting the extendable temple member interior shelf.

9. The spectacle frame of claim 8 wherein the inner surface of the intermediate portion of the fixed temple member has a longitudinally extending groove forming a shoulder at a juncture of the intermediate and distal end portions, and the extendable temple member has a pin received within the fixed temple member groove and engageable with the fixed temple member shoulder to prevent the spring from ejecting the fixed temple member from bore.

10. The spectacle frame of claim 7 wherein the outer surface of the intermediate portion of the fixed temple member has a laterally extending notch and the latch is positioned in the proximal end portion of the extendable temple, member, the latch being engageable with the notch to lock the extendable temple member in the normal position.

11. The spectacle frame of claim 1 wherein the fixed temple member defines a bore extending from the distal end of the fixed temple member to the proximal end portion of the fixed temple member, the bore forming an interior shelf in the proximal end portion of the fixed temple member.

12. The spectacle frame of claim 11 wherein the extendable temple member is received and slidably movable within the fixed temple member bore.

13. The spectacle frame of claim 12 wherein the biasing device comprises a spring disposed within the fixed temple member bore, a distal end of the spring contacting the proximal end of the extendable temple member and a proximal end of the spring contacting the fixed temple member interior shelf.

14. A spectacle frame comprising:
a frame body adapted for housing a pair of lenses; and
first and second temples, each of the temples including
a fixed temple member extending longitudinally from a proximal end to a distal end, the fixed temple member having an arcuate shape, a proximal end portion connected to the frame body, and a distal end portion;
an extendable temple member extending longitudinally from a proximal end to a distal end, the extendable temple member having an arcuate shape, a proximal end portion, a distal end portion, and a magnet mounted to the distal end portion, the extendable temple member defining a bore extending from the proximal end to the distal end portion, the fixed temple member being received and slidably movable within the bore, the extendable temple member being extendable from a normal position, where the proximal end portion of the extendable temple member is proximate to the proximal end portion of the fixed temple member and the distal end portion of the extendable temple member is proximate to the distal end portion of the fixed temple member, and an extend position, where the proximal end portion of the extendable temple member is proximate to the distal end portion of the fixed temple member and the distal end portion the extendable temple member is longitudinally spaced from the distal end portion of the fixed temple member;
a biasing device providing a biasing force for urging the extendable temple member to the extended position; and
a latch for releasably locking the extendable temple member in the normal position against the biasing force of the biasing device.

15. The spectacle frame of claim 14 wherein each temple further includes an extension limiting device for preventing the biasing device from ejecting the fixed temple member from the extendable temple member bore.

16. The spectacle frame of claim 14 wherein the extendable temple member bore forms an interior shelf in the distal end portion of the extendable temple member and the biasing device comprises a spring disposed within the extendable temple member bore, a proximal end of the spring contacting the distal end of the fixed temple member and a distal end of the spring contacting the extendable temple member interior shelf.

17. A spectacle frame comprising:
a frame body adapted for housing a pair of lenses; and
first and second temples, each of the temples including
a fixed temple member extending longitudinally from a proximal end to a distal end, the fixed temple member having an arcuate shape, a proximal end portion connected to the frame body, and, a distal end portion, the fixed temple member defining a bore extending from the distal end of the fixed temple member to the proximal end portion of the fixed temple member;
an extendable temple member extending longitudinally from a proximal end to a distal end, the extendable temple member having an arcuate shape, a proximal end portion, a distal end portion, and a magnet mounted to the distal end portion, the extendable temple member being received and slidably movable within the fixed temple member bore, the extendable temple member being extendable from a normal position, where the proximal end portion of the extendable temple member is proximate to the proximal end portion of the fixed temple member and the distal end portion of the extendable temple member is proximate to the distal end portion of the fixed temple member, and an extend position, where the proximal end portion of the extendable temple member is proximate to the distal end portion of the fixed temple member and the distal end portion the extendable temple member is longitudinally spaced from the distal end portion of the fixed temple member;
a biasing device providing a biasing force for urging the extendable temple member to the extended position; and
a latch for releasably locking the extendable temple member in the normal position against the biasing force of the biasing device.

18. The spectacle frame of claim 17 wherein each temple further includes an extension limiting device for preventing the biasing device from ejecting the extendable temple member from the fixed temple member bore.

19. The spectacle frame of claim 17 wherein the fixed temple member bore forms an interior shelf in the proximal end portion of the fixed temple member and the biasing device comprises a spring disposed within the fixed temple member bore, a distal end of the spring contacting the proximal end of the extendable temple member and a proximal end of the spring contacting the fixed temple member interior shelf.

* * * * *